(12) United States Patent
Son et al.

(10) Patent No.: US 7,932,691 B2
(45) Date of Patent: Apr. 26, 2011

(54) PERMANENT MAGNET MOTOR START-UP

(75) Inventors: Yo Chan Son, Torrance, CA (US); Bon Ho Bae, Torrance, CA (US); Michael Milani, Ranchos Palos Verdes, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 12/107,132

(22) Filed: Apr. 22, 2008

(65) Prior Publication Data
US 2009/0261775 A1    Oct. 22, 2009

(51) Int. Cl.
*H02P 1/24* (2006.01)
(52) U.S. Cl. ............. 318/727; 318/400.03; 318/400.15
(58) Field of Classification Search .......... 318/727, 318/432, 434, 632, 400.02, 400.03, 400.15, 318/400.07, 400.23
See application file for complete search history.

(56) References Cited

U.S. PATENT DOCUMENTS

| | | | | |
|---|---|---|---|---|
| 4,882,524 A | * | 11/1989 | Lee | 318/400.4 |
| 4,912,379 A | * | 3/1990 | Matsuda et al. | 318/400.23 |
| 5,585,709 A | * | 12/1996 | Jansen et al. | 318/807 |
| 6,362,586 B1 | * | 3/2002 | Naidu | 318/432 |
| 6,494,451 B2 | * | 12/2002 | Michel | 271/274 |

OTHER PUBLICATIONS

Wu, R. et al. "A permanent magnet motor drive without a shaft sensor," IEEE Transactions on Industry Applications, 1991, pp. 1005-1012, vol. 27, No. 5.

Shinnaka, S. "A New Current-Ratio-Oriented Simple Vector Control Method for Starting Up Sensorless Drive of Permanent-Magnet Synchronous Motors—Feedback Control of Effective Reactive Currents Based on "MIR Strategy"," Conference Record of the 41st Annual meeting—IEEE Transactions on Industry Applications Conference, 2006, pp. 2054-2061, vol. 4.

* cited by examiner

*Primary Examiner* — Rina I Duda
(74) *Attorney, Agent, or Firm* — Ingrassia Fisher & Lorenz, P.C.

(57) ABSTRACT

Methods and apparatus are provided for startup of a permanent magnet alternating current (AC) motor. The method comprises the steps of detecting startup of the permanent magnet AC motor; detecting a mechanical oscillation of the permanent magnet AC motor when startup of the permanent magnet AC motor is detected; and, in response to detection of the mechanical oscillation of the permanent magnet AC motor when startup is detected, suppressing the mechanical oscillation of the permanent magnet AC motor.

11 Claims, 9 Drawing Sheets

US 7,932,691 B2

PERMANENT MAGNET MOTOR START-UP

TECHNICAL FIELD

The present invention generally relates to electric motor systems, and more particularly relates to a method and apparatus for sensorless start-up of a permanent magnet alternating current (AC) electric motor in an electric motor system.

BACKGROUND OF THE INVENTION

During start-up acceleration of a permanent magnet alternating current (AC) electric motor in accordance with conventional algorithms that estimate the rotor position based on the voltage and current without using the rotor position or speed sensor (i.e., in accordance with "sensorless algorithms"), a current vector position is forced to increase with a fixed profile and a position of a rotor of the motor is expected to lag behind the current vector position, while a current amplitude is controlled to be constant. If there is a big load torque required during the start up sequence, then current is set high enough to generate the required startup torque, while in the light load condition, the current introduces transient oscillations of the angle difference between the current vector and the rotor position in the motor. These transient oscillations generate undesired mechanical oscillations in the permanent magnet AC motor during startup thereof.

Accordingly, it is desirable to provide a method and apparatus for start-up of a permanent magnet AC motor in an electric motor system reduced mechanical oscillations. In addition, it is desirable to prevent current overshoot during a sensorless start up of a permanent magnet AC motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for startup of a permanent magnet alternating current (AC) motor. The method comprises the steps of detecting startup of the permanent magnet AC motor; detecting a mechanical oscillation of the permanent magnet AC motor when startup of the permanent magnet AC motor is detected; and, in response to detection of the mechanical oscillation of the permanent magnet AC motor when startup is detected, suppressing the mechanical oscillation of the permanent magnet AC motor.

In addition, a controller is provided for generating torque command currents for control of a permanent magnet AC motor. The controller comprises a current ripple detector, a startup torque command module, a torque-to-current converter and a startup switch controller. The current ripple detector detects a current ripple in stator currents of the permanent magnet AC motor and generates a current ripple signal in response thereto. The startup torque command module is coupled to the current ripple detector and modifies a predetermined startup torque command in response to the current ripple signal to generate a torque command. The torque-to-current converter converts the torque command to torque command currents, and the startup switch controller couples the startup torque command module to the torque-to-current converter after startup of the permanent magnet AC motor while a speed of the permanent magnet AC motor is less than a predetermined speed.

Further, an electric motor system is provided, the electric motor system comprising a permanent magnet AC motor, a field orientation controller and a controller. The field orientation controller is coupled to the permanent magnet AC motor for modifying phase currents supplied to the permanent magnet AC motor to provide electric control therefore. The controller is coupled to the phase currents and comprises a current ripple detector, a startup torque command module, a torque-to-current converter and a startup switch controller. The current ripple detector detects a current ripple in the phase currents of the permanent magnet AC motor and generates a current ripple signal in response thereto. The startup torque command module is coupled to the current ripple detector for modifying a predetermined startup torque command in response to the current ripple signal to generate a torque command. And the torque-to-current converter converts the torque command to torque command currents. The startup switch controller couples the startup torque command module to the torque-to-current converter after startup of the permanent magnet AC motor while a detected speed of the permanent magnet AC motor is less than a predetermined speed. The field orientation controller is further coupled to the torque-to-current converter for modifying the phase currents for control of the permanent magnet AC motor in response to pulse width modulated currents generated in response to the torque command currents.

DESCRIPTION OF THE DRAWINGS

The present invention will hereinafter be described in conjunction with the following drawing figures, wherein like numerals denote like elements, and FIG. 1, including

FIG. 4, including

FIG. 5, including

FIG. 6, including

FIG. 7, including FIG. 8, including

DESCRIPTION OF AN EXEMPLARY EMBODIMENT

Figure 1C:
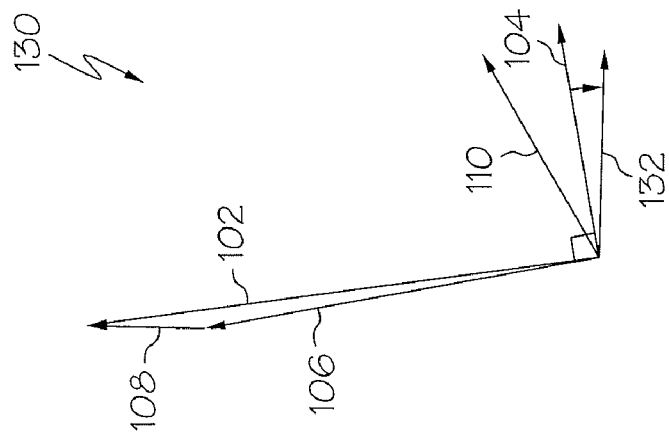
FIGS. 1A, 1B and 1C, illustrates vector diagrams of states of operation of an electric motor system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The oscillatory response of a permanent magnet alternating current (AC) motor (PMAC) without a shaft sensor is well known, and its mechanical behavior is modeled in Equation (1), assuming a constant current vector is rotated during the sensorless start-up sequence:

$$J_m \frac{d^2}{dt^2}\theta_r + B_m \frac{d}{dt}\theta_r + T_L = K_T i_s \sin(\theta_e - \theta_r) \quad (1)$$

where $J_m$ is the inertia of the motor, $B_m$ is the friction coefficient, $T_L$ is the (constant) load torque, $K_T$ is the torque constant of PMAC, $i_s$ is the amplitude of the motor current, $\theta_r$ is the rotor position, and $\theta_e$ is the angular position of the stator current vector. During startup acceleration in accordance with most conventional startup algorithms, the current vector position $\theta_e$ is forced to increase with a fixed profile and the current amplitude $i_s$ is controlled to be constant. Accordingly, the rotor position $\theta_r$ is expected to lag behind the stator current angle.

The rotor position $\theta_r$ has a relation with the current vector position $\theta_e$ as shown in Equation (2), and the amplitude of the motor current is defined as shown in Equation (3).

$$\theta_e = \theta_r + \Delta + \delta \quad (2)$$

$$i_s = I_s + \tilde{i}_s \quad (3)$$

where $\delta$ is the small-signal portion of the position difference, and $\Delta$ defines the average position difference between the current vector and the rotor position. $I_s$ is the average current amplitude, $\sim$ and means the small-signal current variations. If there is a heavy load torque required during the startup sequence, then $I_s$ should be set to generate enough startup torque and $\Delta$ tends to be close to $+\pi/2$. In a light load condition, $\Delta$ converges to 0. The small-signal portion of the position difference $\delta$ represents the transient oscillation of the angle difference between the current vector and the rotor position. Therefore, Equation (1) can be approximated as shown in Equation (4) assuming that the small-signal portion of the position difference $\delta$ is small.

$$J_m \frac{d^2}{dt^2}\theta_r + B_m \frac{d}{dt}\theta_r + T_L \approx K_T I_s \sin\Delta + (K_T I_s \cos\Delta)\cdot\delta + (K_T \sin\Delta)\cdot\tilde{i}_s \quad (4)$$

The first term on the right side of Equation (4) accounts for the acceleration torque during startup, and the second and third terms are related to the oscillatory response. In a steady state, the oscillation during startup is modeled as shown in Equation (5) by dropping the first term on the right side of Equation (4).

$$J_m \frac{d^2}{dt^2}\delta + B_m \frac{d}{dt}\delta + (K_T I_s \cos\Delta)\cdot\delta = -(K_T \sin\Delta)\cdot\tilde{i}_s \quad (5)$$

In Equation (5), the mechanical oscillation is excited by the current variation and its natural frequency of oscillation is determined by the inertia $J_m$ and the average current. As the mechanical friction becomes smaller with respect to the inertia $J_m$, the mechanical system as represented in Equation (5) tends to be more oscillatory. This mechanical oscillation can also excite the oscillation of the motor current. The circuit equation of the PMAC motor can then be approximated in the complex form as shown in Equation (6), neglecting the effect of the motor resistance.

$$\vec{V}_s = jN_r L_s \vec{I}_s + jN_r \Psi_f e^{-j(\Delta+\delta)} = jN_r L_s \vec{I}_s + \vec{E} \quad (6)$$

where $V_s$ is the motor voltage, $L_s$ is the stator inductance, $r_s$ is the stator resistance, and $\Psi_f$ is the magnetic flux created by the permanent magnet, $N_r$ is the motor speed, j stands for the imaginary unit of the complex number, and $\rightarrow$ stands for the complex vector quantity.

Figure 1B:
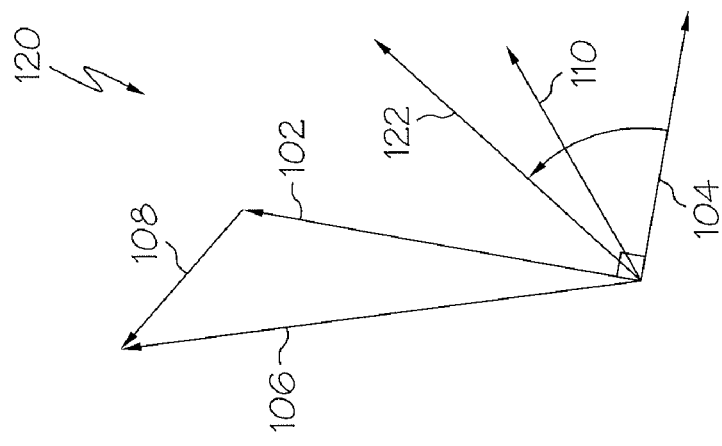
Figure 1A:
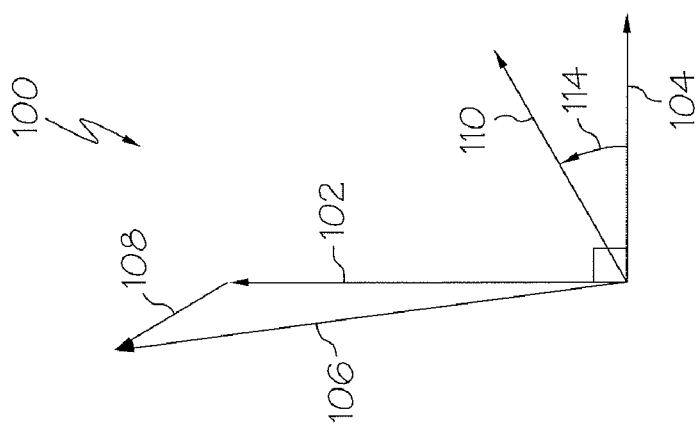

Referring to FIG. 1A, a vector diagram 100 at the steady-state of a conventional PMAC motor (i.e., when $\delta=0$ and $\tilde{i}_s=0$) is depicted. FIGS. 1B and 1C depict vector diagrams 120 and 130, respectively, at non-steady states of the PMAC motor. The vector E 102 represents the back electromotive force (BEMF) that is made by the magnetic flux, and it advances by 90° from the flux position vector 104. According to Equation (6), the motor current vector 110 is determined by the relation between the motor voltage vector 106 and the BEMF vector 102, and it is perpendicular to the vector $\vec{V}_s - \vec{E}$ 108.

If the current controller is not fast enough to regulate the current, then the motor voltage (i.e., the output of the current controller) will vary slowly. The vector diagram 100 represents a steady-state vector diagram when there is no oscillation of the motor position or the current amplitude. The current vector $\vec{I}_s$ 110 leads the magnetic flux vector 104 by a position difference $\Delta$ 114. Referring to vector diagrams 120 and 130, the position of the voltage vector 106 is unchanged from the position of the voltage vector 106 in FIG. 1A. Due to the mechanical oscillation of Equation (5), when $\delta$ is positive, as shown in vector diagram 120, the motor current increases (i.e., vector 122 as compared to the original motor current vector 110 (shown in FIGS. 1B and 1C for comparison)). In the opposite case, as shown in vector diagram 130, the motor current decreases (i.e., vector 132 as compared to the original motor current vector 110). Accordingly, it is clear from the vector diagrams of FIGS. 1A, 1B and 1C that the mechanical oscillation of the PMAC motor results in the oscillation of the motor current. Conversely, it is also clear that the mechanical oscillation can be detected and suppressed by variation of the motor current during the startup sequence.

Figure 2:
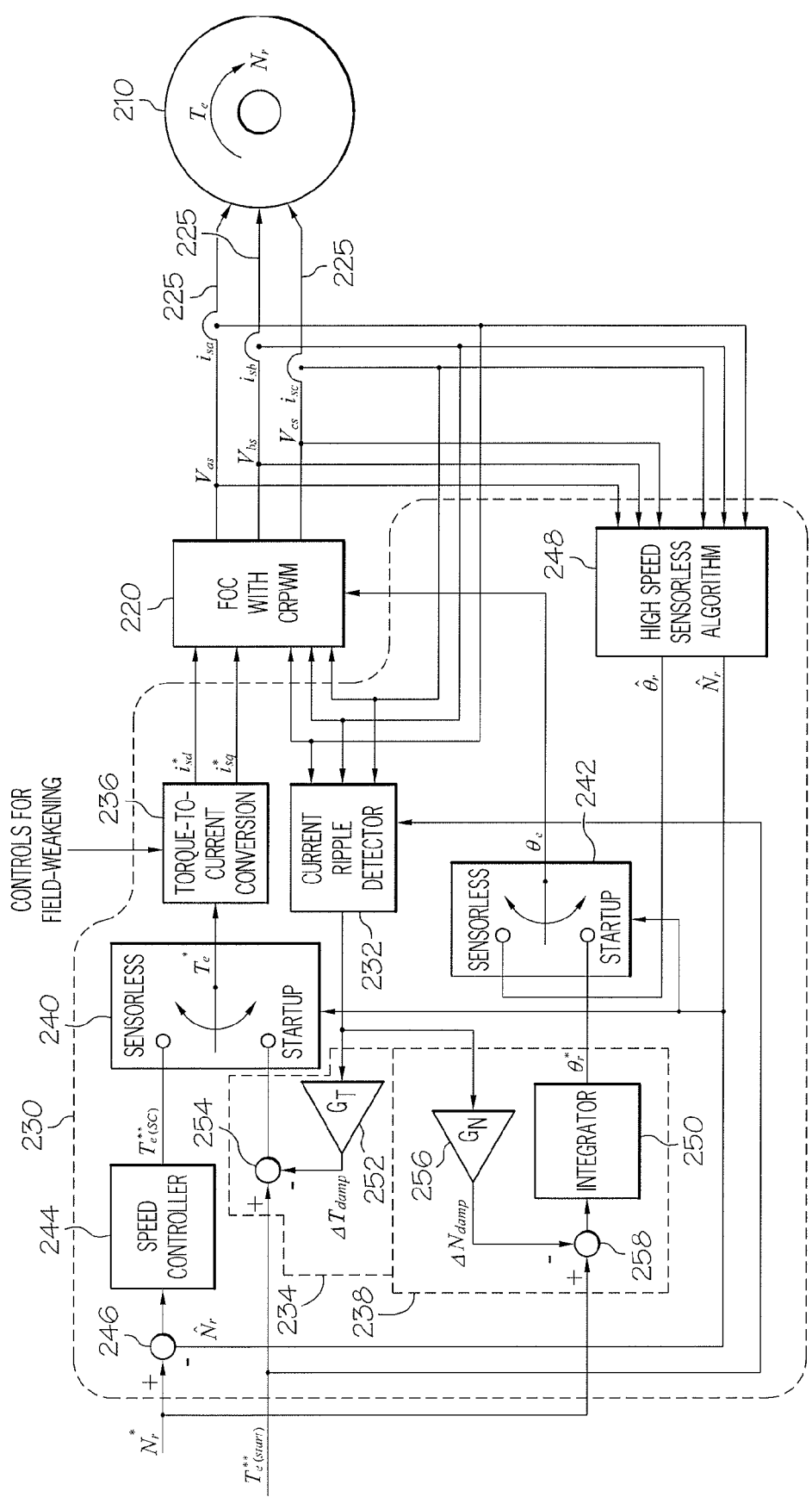
FIG. 2 illustrates a block diagram of an electric motor system in accordance with an embodiment of the present invention.

Referring to FIG. 2, a block diagram of an electric motor system 200 in accordance with an embodiment of the present invention includes a three phase PMAC motor 210 having a torque $T_e$ and a speed $N_r$. A field orientation controller 220 with current regulated pulse width modulation generates and provides stator currents on three phases 225 to the PMAC motor 210 for electric control thereof. A controller 230 is coupled to the phases 225 for receiving voltages and sensed stator currents from each of the phases 225 to provide a sensorless drive mechanism for driving the PMAC motor 210. To provide the sensorless drive mechanism, a sensorless algorithm module 248 estimates the motor speed $\hat{N}_r$ and position $\hat{\theta}_r$ based on the motor voltage ($V_{as}$, $V_{bs}$ and $V_{cs}$) and the motor current ($i_{as}$, $i_{bs}$ and $i_{cs}$). When switches 240 and 242 are set to 'sensorless mode', a speed controller 244 generates the torque command $T^{**}_{e(sc)}$ to control the motor speed in accordance with the speed command $N^*_r$, and a torque-to-current conversion block 236 translates the torque command $T^{**}_{e(sc)}$ into a corresponding current command to drive the field orientation controller 220.

In most case, the sensorless algorithm module 248 can provide accurate estimation results at high speed. However, such estimation is practically impossible at zero speed or in a low speed region where the motor voltage is too small to be used for the estimation. In such cases, in accordance with the present embodiment, the switches 240 and 242 are set to "start-up mode", thereby allowing acceleration based on the torque and speed commands. During this acceleration, the PMAC motor 210 can exhibit mechanical oscillation.

The controller 230 utilizes two methods to suppress the mechanical oscillation of the PMAC motor 210 during the startup sequence to provide faster acceleration during startup with increased startup torque limits without increasing phase current protection limits. One method calls for adjusting the current amplitude $I_s$ to suppress the source of the mechanical oscillation shown in Equation (5), and the other method calls for adjusting the current vector position $\theta_e$ to dampen the oscillatory response shown in Equation (5).

In accordance with the present embodiment, the controller 230 includes a current ripple detector 232 for detecting a current ripple in stator currents of the three phases 225. The current ripple detector 232 generates a current ripple signal in response to the stator currents and a startup torque command module 234 modifies a predetermined startup torque command $T^{**}_{e(start)}$ in response to the current ripple signal to generate a torque command $T^*_e$ for provision to the torque-to-current converter 236. The torque-to-current converter 236 converts the torque command $T^*_e$ to the current command $i^*_{sd}$, $i^*_{sq}$ for provision to the field orientation controller 220. A startup rotor position module 238 is also coupled to the current ripple detector 232 and modifies the speed command $N^*_T$ in response to the current ripple signal to generate a startup rotor position signal $\theta^*_r$, the startup rotor position signal $\theta^*_r$ also being provided to the field orientation controller 220.

For switching from startup mode to high speed sensorless operation, the first startup switch controller 240 and the second startup switch controller 242 operate to place the controller 230 in a startup mode operation when the speed of the PMAC motor 210 is detected or presumed to be less than a predetermined speed and in a high speed sensorless mode when the speed of the PMAC motor 210 is detected or presumed to be greater than or equal to the predetermined speed. The first startup switch controller 240 couples the startup torque command module 234 to the torque-to-current converter 236 after startup of the PMAC motor 210 while the detected speed of the PMAC motor 210 is less than the predetermined speed. When the detected speed of the PMAC motor is more than the predetermined speed, the first startup switch controller 240 couples the speed controller 244 to the torque-to-current converter 236 for sensorless control of the PMAC motor 210 at speeds greater than the predetermined speed. The input to the speed controller 244 is a signal from a summer 246 which calculates the difference between the speed command $N^*_T$ and a high speed sensorless speed signal $\hat{N}_r$ generated by the high speed sensorless algorithm module 248 in response to the sensed currents and voltages of the phases 225.

The second startup switch controller 242 couples the startup rotor position module 238 to the torque-to-current converter 236 after startup of the PMAC motor 210 while the detected speed of the PMAC motor 210 is less than the predetermined speed. When the detected speed of the PMAC motor is more than the predetermined speed, the second startup switch controller 242 couples the high speed sensorless algorithm module 248 to the torque-to-current converter 236 to receive a sensorless rotor position signal $\hat{\theta}_r$ therefrom, the sensorless rotor position signal $\hat{\theta}_r$ also generated by the high speed sensorless algorithm module 248 in response to the sensed currents and voltages of the phases 225.

During the startup mode, the torque command is fixed to be $T^{**}_{e(start)}$ and the rotor position for the motor control $\theta_e$ is set to be the commanded position $\theta^*_r$ that is calculated by an integrator 250 of the startup rotor position module 238 to be the integral of the commanded speed $N^*_r$. The current ripple signal from the current ripple detector 232 is utilized to modify fixed startup torque $T^{**}_{e(start)}$ and the commanded position $\theta^*_r$ by a torque damping signal $\Delta T_{damp}$ and a speed damping signal $\Delta N_{damp}$, respectively. The torque damping signal $\Delta T_{damp}$ is generated by a torque dampening module 252 in response to the current ripple signal and the fixed startup torque $T^{}_{e(start)}$ is modified at a startup torque command summer 254 by subtracting the torque damping signal $\Delta T_{damp}$ from the fixed startup torque $T^{}_{e(start)}$, thereby generating the torque command for provision during the startup mode to the torque-to-current converter 236. Likewise, the speed damping signal $\Delta N_{damp}$ is generated by a speed dampening module 256 in response to the current ripple signal and the speed command $N^*_r$ is modified at a startup speed summer 258 by subtracting the speed damping signal $\Delta N_{damp}$ from the speed command $N^*_r$, the difference provided to the integrator 250 to generate the commanded position $\theta^*_r$ for provision to the field orientation controller 220 during the startup mode.

The actual rotor position $\theta_r$ is supposed to follow the commanded position $\theta_r$. After reaching the predetermined speed, which is determined to be a sufficient speed level at which the high speed sensorless controller 248 can work properly, the first and second startup switch controllers 240, 242 switch the controller 230 from startup mode operation to sensorless mode operation.

Figure 3:
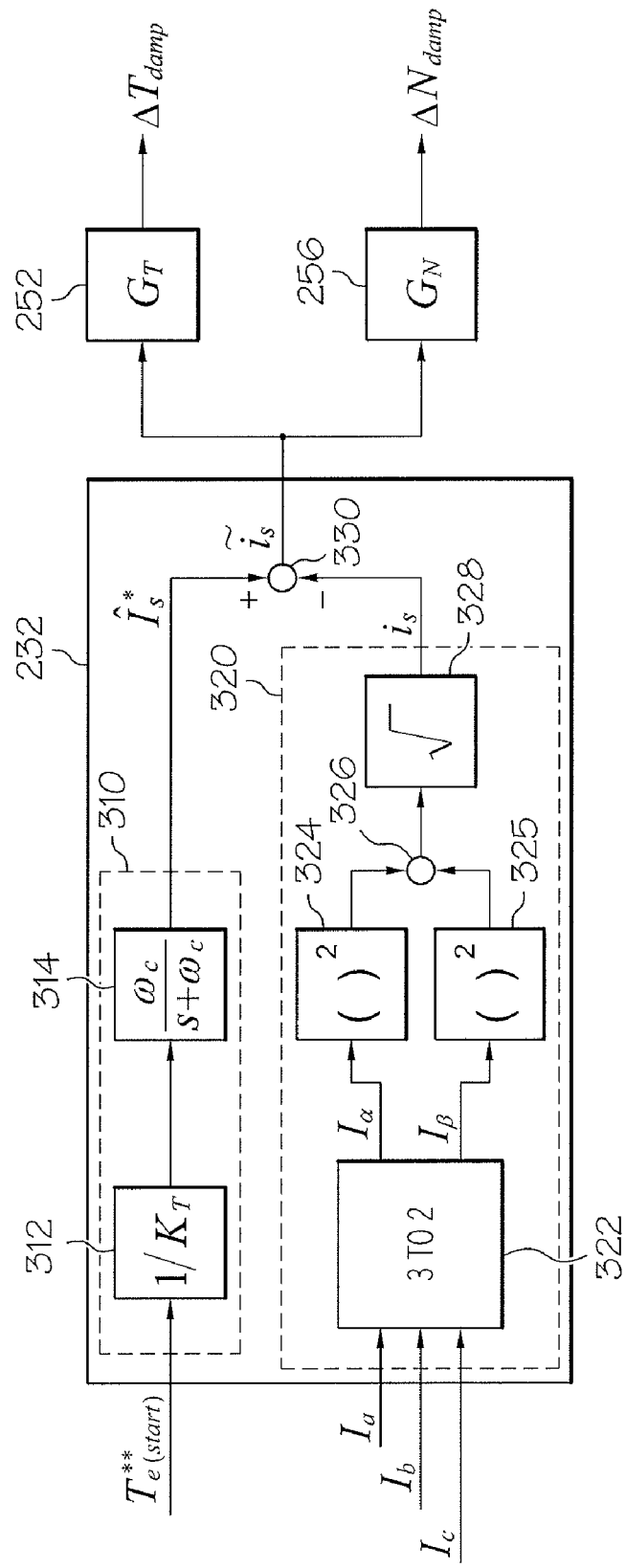
FIG. 3 illustrates a block diagram of a current ripple detector of the electric motor system of FIG. 2 in accordance with the embodiment of the present invention.

Referring to FIG. 3, a block diagram of the current ripple detector 232 in accordance with the embodiment of the present invention is shown with the torque dampening module 252 and the speed dampening module 256. A transient current simulation module 310 simulates the response of the field orientation controller 220 and generates a transient current signal in response to the stator currents, the transient current signal simulating a desired transient response of the current amplitude in accordance with the torque command. A first module 312 of the transient current simulation module 310 multiplies the startup torque command $T^{**}_{e(start)}$ by the inverse of the torque constant $K_T$ to generate a corresponding current command amplitude signal. The current command amplitude signal then passes through the $1^{st}$-order low-pass filter 314 to simulate the response of the field orientation controller 220, resulting in the transient current signal which is the expected current response $\hat{I}^*_s$ from the torque command. The motor torque of the PMAC motor 210 is proportional to the motor current and the field orientation controller 220 is designed to have a $1^{st}$-order response with the bandwidth of $\omega_c$. The low-pass filter 314 may be dropped in certain applications where the current control response is fast enough.

A current amplitude adjustment module 320 generates a current amplitude signal representing a current amplitude of the motor current from the three stator currents. A three to two conversion block 322 converts the three-phase stator currents into two-phase (orthogonal) currents. First and second squaring blocks 324, 325 square each of the orthogonal currents, a summer 326 adds the squares of the currents and a square root block 328 generates a current amplitude signal $i_s$. A current ripple summer 330 generates the current ripple signal $\tilde{i}_s$ as the difference between the expected current response $\hat{I}^*_s$ and the current amplitude signal $i_s$. The current ripple signal $\tilde{i}_s$ is representative of the ripple current that is the result of the oscillations shown in Equations (5) and (6) above.

The output of the current ripple detector 232 is utilized to calculate the compensation values for the torque command and the speed command, respectively, by the torque dampening module 252 $G_T$ and the speed dampening module 256 $G_N$. The speed dampening module 256 $G_N$ converts the current ripple into the speed damping signal to dampen the response of the oscillation shown in Equation (5). Referring back to FIG. 1B, when the rotor position lags behind expected rotor position as determined from the steady-state vector diagram 100 of FIG. 1B, then the current amplitude vector 122 exceeds the commanded current vector 110 corresponding to the commanded torque. It is therefore necessary to reduce the rotational speed of the current vector to be approximate the steady-state current vector 110.

In the opposite case, as shown in FIG. 1C, the rotor position is leading over the expected rotor position and the current amplitude vector 132 is reduced. It is therefore necessary in this condition to speed up the rotation of the current vector 132 to keep up with the commanded current vector 110. The speed damping signal from the speed dampening module 256 $G_N$ in FIGS. 2 and 3 should therefore be positive in the frequency range of the oscillation to reduce the input of to the integrator 250.

The torque dampening module 252 $G_T$ functions in a similar manner. As shown in Equation (6), the current is determined by the motor voltage and the back EMF. In a start-up sequence having the behavior shown in Equation (6), it is difficult to control the current due to the disturbance caused by the oscillation of the back EMF, thereby possibly resulting in over-current failure. The torque damping signal from the torque dampening module 252 $G_T$ in accordance with the present embodiment reduces the torque command when the motor is not able to follow the commanded current in order to prevent such over-current failure. At the same time, the torque damping signal suppresses the source of the mechanical oscillation shown in Equation (5) as the right-side term. Similarly to the speed damping signal, the original torque command $T^{**}_{e(start)}$ is subtracted from the torque damping signal output from the torque dampening module 252 $G_T$.

In accordance with the present embodiment, the controller 230 can be implemented using both the torque dampening module 252 $G_T$ and the speed dampening module 256 $G_N$, or the controller 230 can be implemented using only of the torque dampening module 252 $G_T$ or the speed dampening module 256 $G_N$. In addition, both the torque dampening module 252 $G_T$ and the speed dampening module 256 $G_N$ may be implemented using constant values or may be implemented in the form of a frequency function.

Thus it can be seen that a method for startup of the PMAC motor 210 includes detecting startup of the motor 210 and activating the first and second startup switch controllers to operate the controller 230 in the startup mode. Startup of the motor 210 is defined as operation of the motor 210 at speeds less than the predetermined speed necessary for adequate operation of the high speed sensorless controller 248. During the startup mode operation of the controller 230, the current ripple detector 232 detects the mechanical oscillations of the PMAC motor 210 by detecting the current ripple in the stator currents of the phases 225.

While a particular implementation of the current ripple detector 232 has been shown in FIG. 3, other implementations in accordance with the present embodiment will also be readily apparent to those skilled in the art. For example, the current ripple detector 232 can be substituted by any high-pass filter or band-pass filter when the frequency of the mechanical oscillation is well known.

Figure 4A:
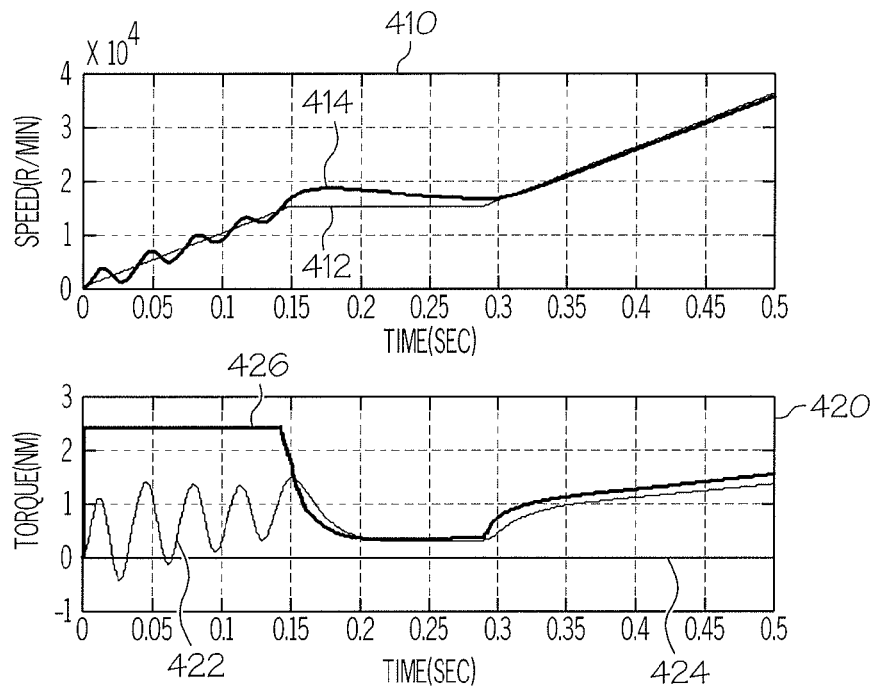
FIGS. 4A and 4B illustrates graphs of startup response of an electric motor system utilizing neither torque nor speed dampening in accordance with the embodiment of the present invention.
Figure 4B:
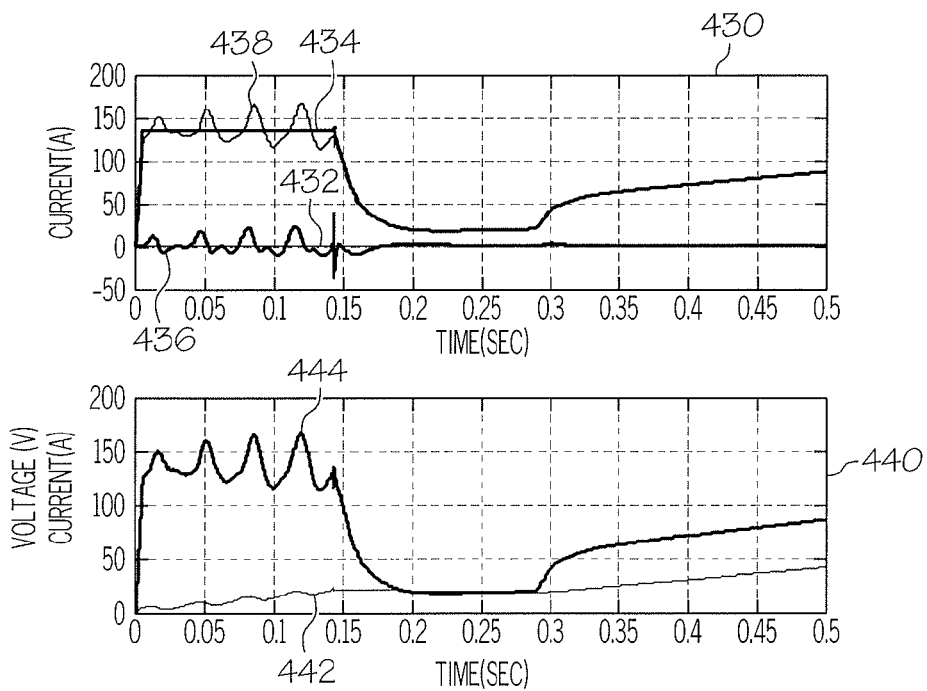

Referring next to FIG. 4, including FIGS. 4A and 4B, the graphs 410, 420, 430 and 440 illustrate a first startup response of a high-speed surface-mounted PMAC motor 210. The maximum speed of the motor 210 is 84,000 rpm and the high-speed sensorless algorithm can work properly if the speed of the motor 210 is greater than 10,000 rpm. In FIG. 4, the motor 210 is to be spun up to 15,000 rpm by a startup sequence utilizing neither torque nor speed dampening in accordance with the embodiment of the present invention. Referring to FIG. 4A, graph 410 illustrates the increase of speed as a function of time and graph 420 illustrates the torque of the motor 210 as a function of time. During the time period from t=0 sec to t=0.15 sec, the motor 210 is operated in the startup mode and the oscillatory behavior of the motor can clearly be seen. For example, in graph 410, trace 412 depicts the speed command, while trace 414 depicts the actual speed of the motor 210. In graph 420, trace 422 depicts the actual torque generated by the motor 210, the external torque that counteracts the motor torque being set to zero (trace 424) because no mechanical load during the startup sequence. The trace 426 depicts the torque command $T^{**}_e$.

Referring to graph 430 of FIG. 4B, the torque command $T^{**}_e$ is transformed into the current command $i^*_{sd}/i^*_{sq}$ by the torque-to-current converter 236. The current command $i^*_{sd}$ trace 432, and the current command $i^*_{sq}$, trace 434, are determined by the torque-to-current conversion block 236 in response to the torque command $T^{**}_e$ and operational conditions such as the motor speed and the inverter voltage. The traces 436 and 438 depict the orthogonal currents $I_{sd}$ and $I_{sq}$ which carry the oscillations generated by the mechanical oscillations of the motor 210 during the startup mode.

The voltage and current amplitudes of the motor 210, $V_s$ and $I_s$, are depicted as traces 442 and 444 on graph 440 of FIG. 4B. The current amplitude $I_s$ increases in an oscillatory manner until the sensorless algorithm is activated at t=0.15 sec and the motor torque (trace 422, graph 420) and speed (trace 414, graph 410) also show oscillatory behavior.

Figure 5A:
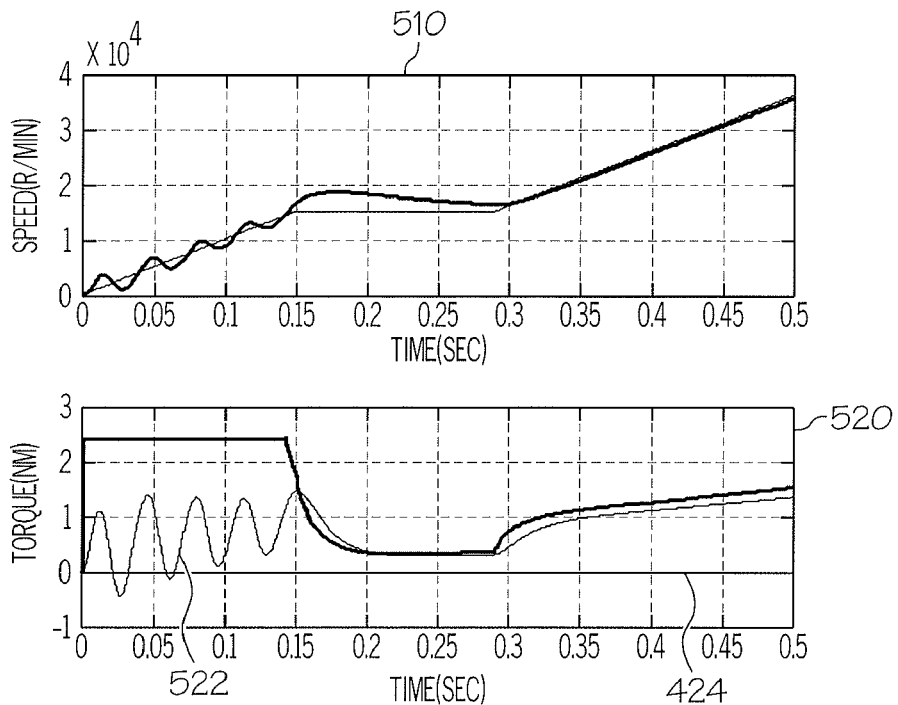
FIGS. 5A and 5B illustrates graphs of startup response of an electric motor system utilizing torque dampening in accordance with the embodiment of the present invention.
Figure 5B:
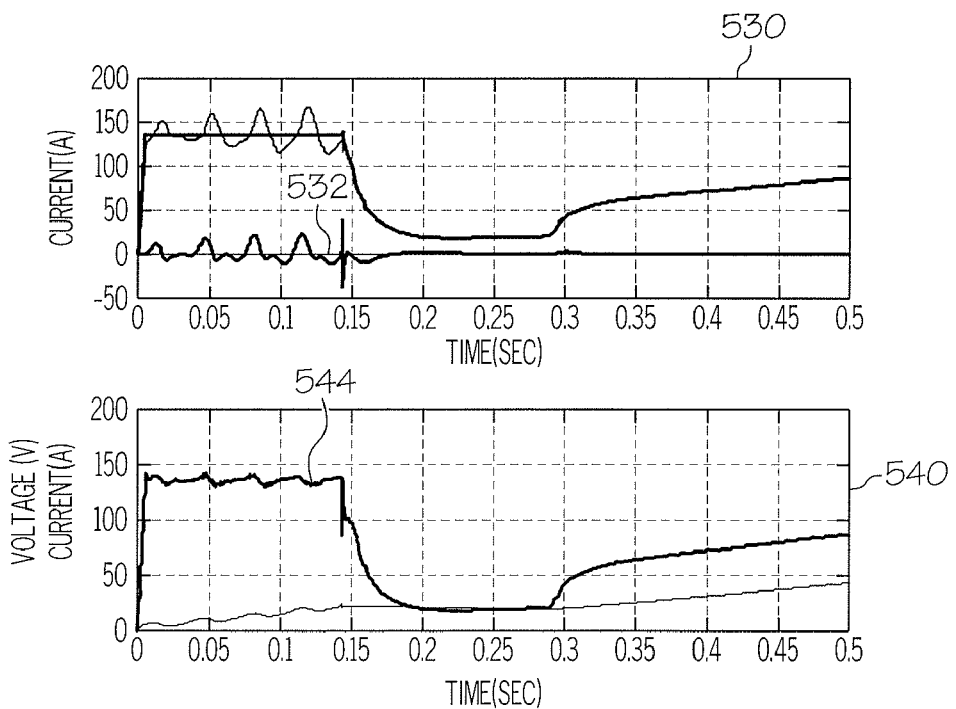

Referring to FIG. 5, including FIGS. 5A and 5B, graphs 510, 520, 530 and 540 correspond to graphs 410, 420, 430 and 440, respectively, and differ only in that the graphs of FIG. 5 illustrate the response of the motor 210 during a startup mode when only torque dampening $G_T$ is used. The current ripple detector 232 detects the current ripple $ĩ_s$, and the torque signal $\Delta T_{damp}$ is added at the summer 254 which changes the current command $i^*_{sd}$, trace 532, with respect to the current ripple. Even though the current amplitude, trace 544, is stabilized, the torque response 522 is still oscillatory and not dampened sufficiently.

Figure 6A:
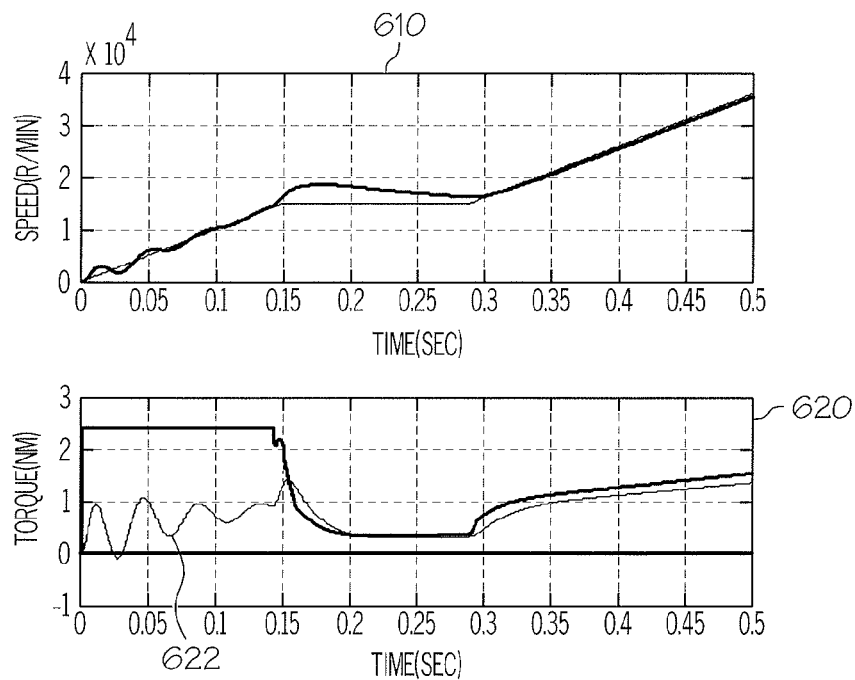
FIGS. 6A and 6B illustrates graphs of startup response of an electric motor system utilizing speed dampening in accordance with the embodiment of the present invention.
Figure 6B:
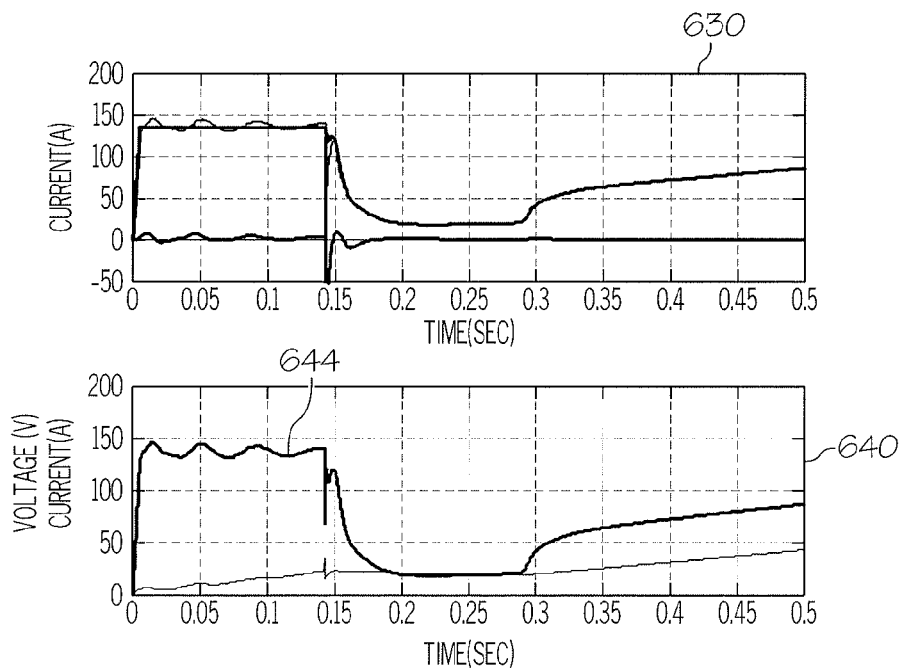

Referring to FIG. 6, including FIGS. 6A and 6B, graphs 610, 620, 630 and 640 correspond to graphs 410, 420, 430 and 440, respectively, and differ only in that the graphs of FIG. 6 illustrate the response of the motor 210 during a startup mode when only speed dampening $G_N$ is used. The motor torque, trace 622, is dampened as time goes by, but the current response, trace 644 still has the oscillatory nature.

Figure 7A:
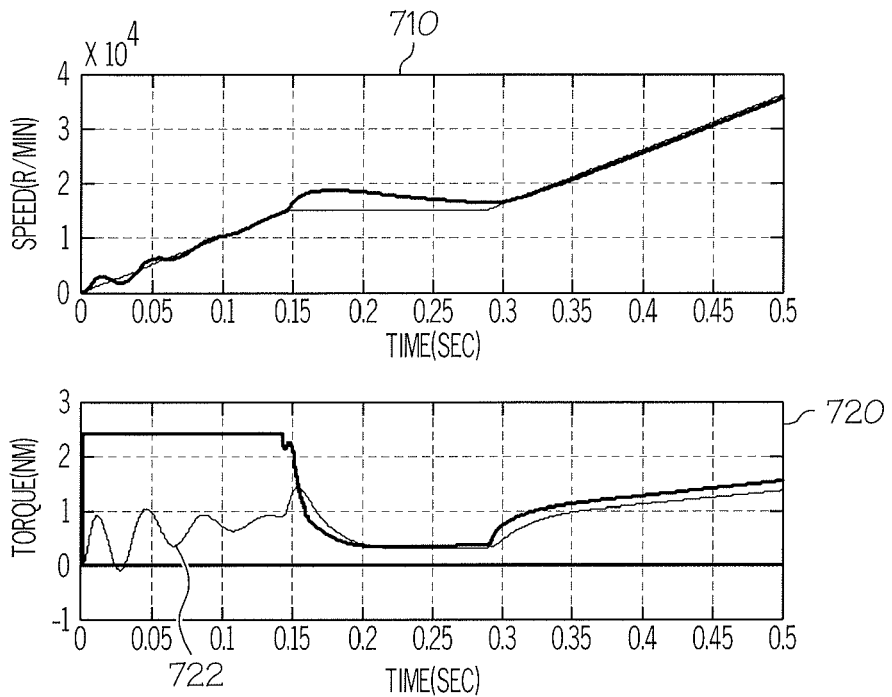
FIGS. 7A and 7B illustrates graphs of startup response of the electric motor system of FIG. 2 utilizing both torque and speed dampening in accordance with the embodiment of the present invention.
Figure 7B:
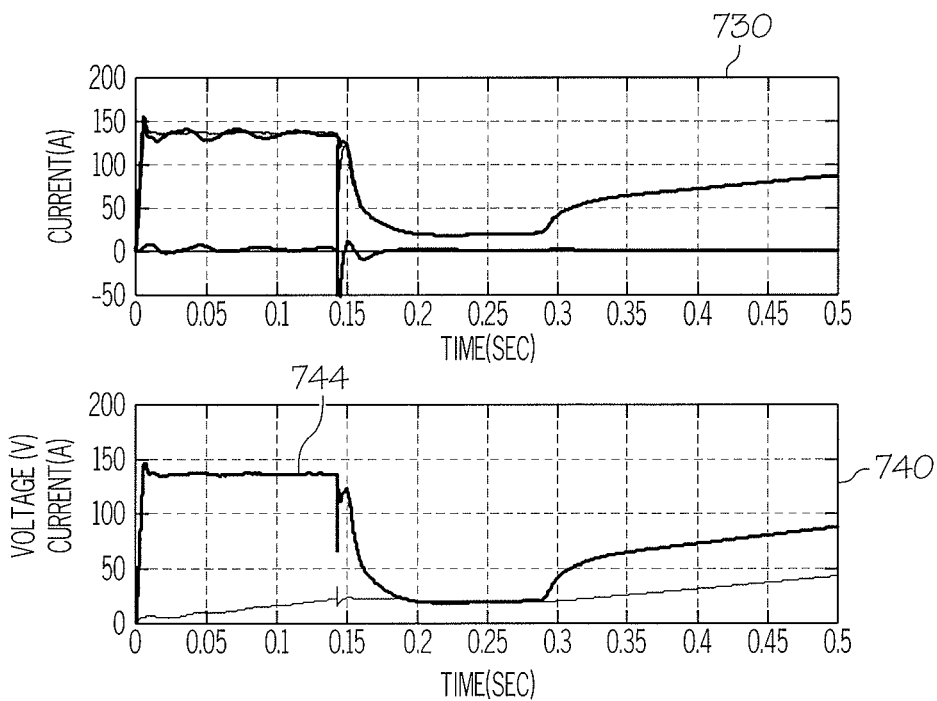

Referring to FIG. 7, including FIGS. 7A and 7B, graphs 710, 720, 730 and 740 correspond to graphs 410, 420, 430 and 440, respectively, and illustrate the response of the motor 210 during a startup mode when both torque dampening $G_T$ and speed dampening $G_N$ in accordance with the present embodiment is used. As can be seen in graphs 730 and 740 of FIG. 7B, the current amplitude (e.g., trace 744) shows a well-controlled, non-oscillatory behavior, thereby dampening the mechanical oscillation of the PMAC motor 210.

Figure 8A:
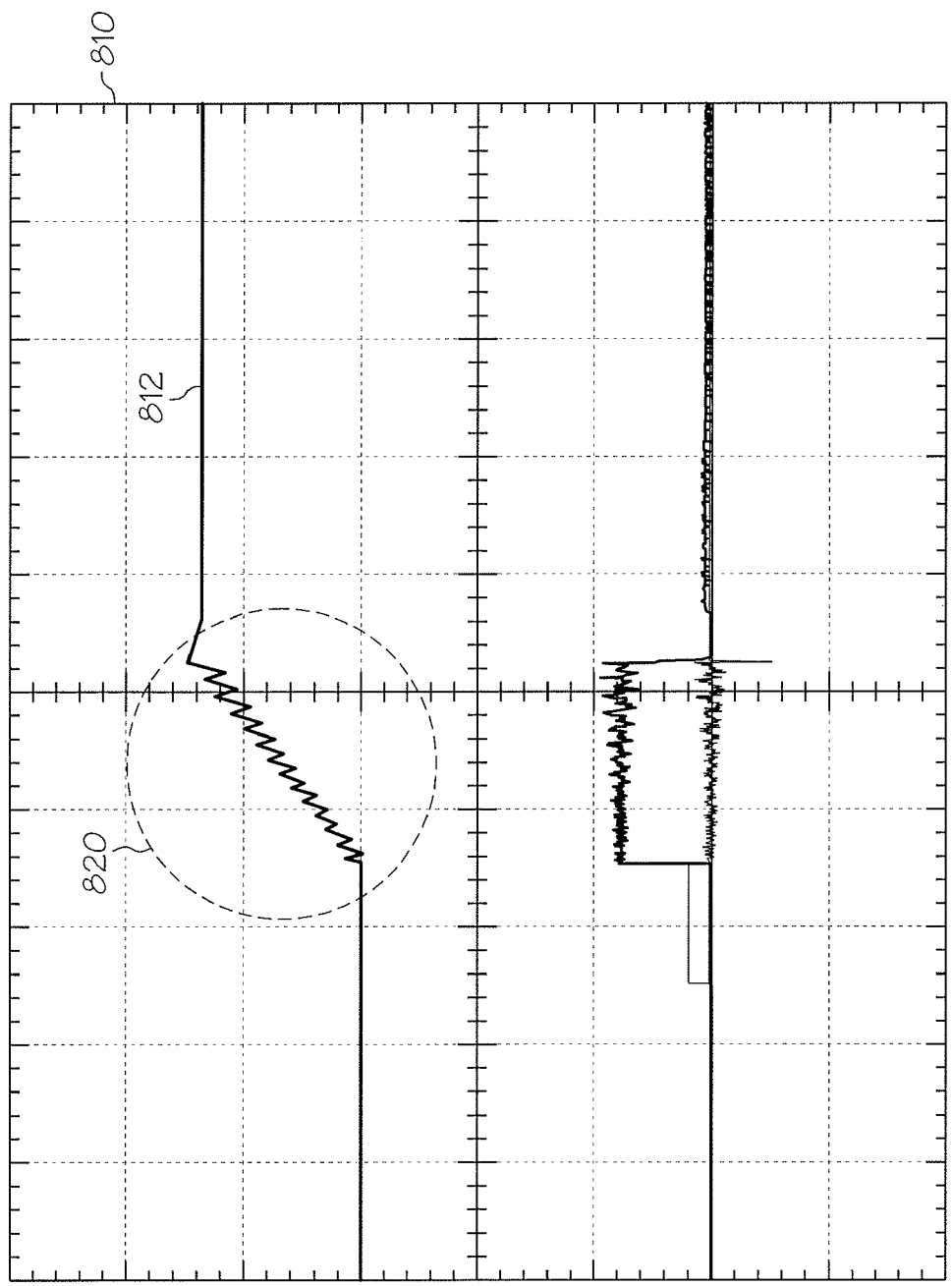
FIGS. 8A and 8B, illustrates graphs of current response for an electric motor system without torque and speed dampening in accordance with the embodiment of the present invention (FIG. 8A) and for the electric motor system of FIG. 2 with torque and speed dampening in accordance with the embodiment of the present invention (FIG. 8B).
Figure 8B:
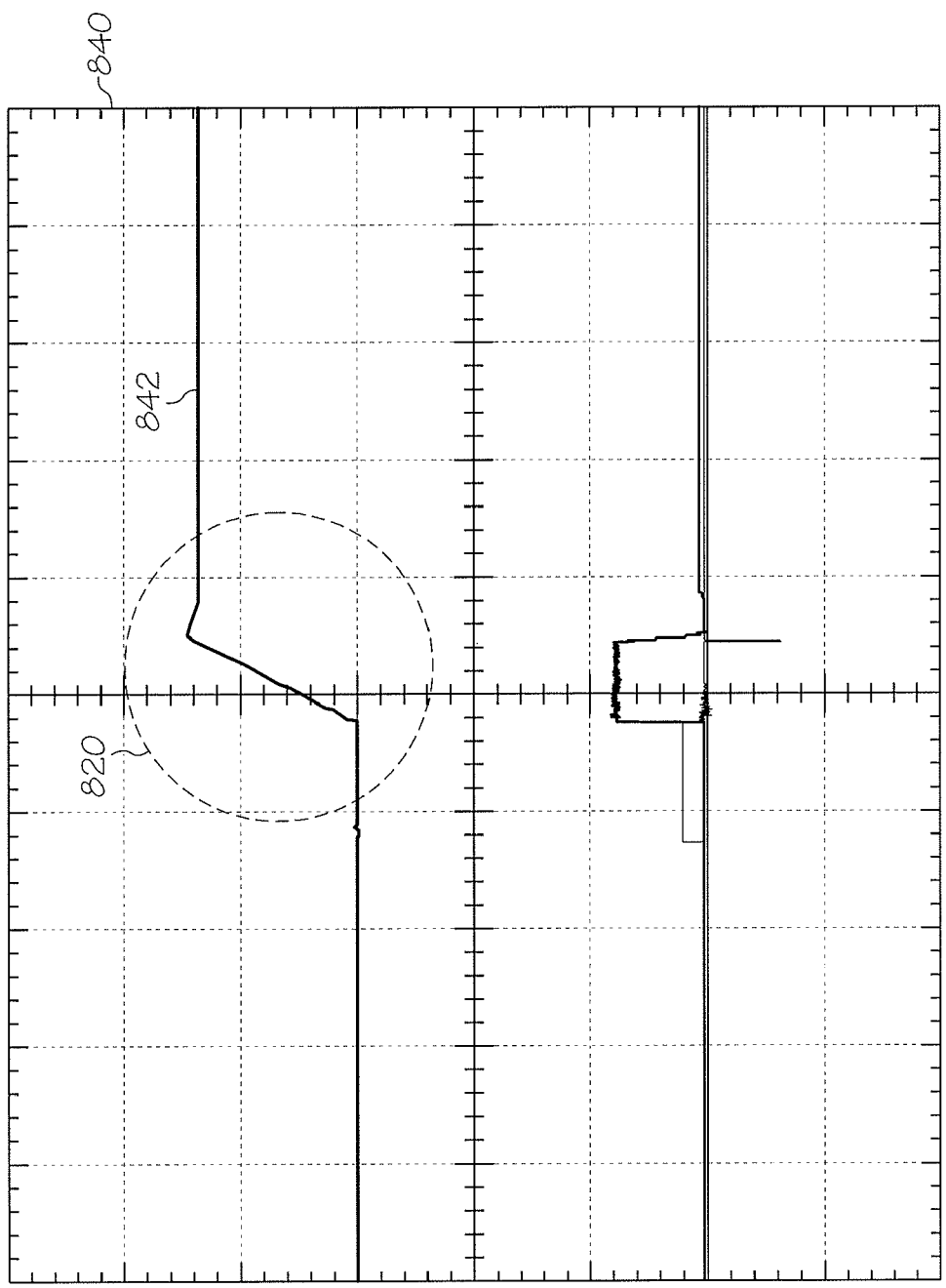

Referring to FIG. 8, including FIGS. 8A and 8B, graph 810 illustrates the current response for the electric motor system 200 without torque and speed dampening in accordance with the embodiment of the present invention. Graph 840 illustrates the current response for the electric motor system 200 with torque and speed dampening in accordance with the embodiment of the present invention. The circled portion 820 in graphs 810 and 840 shows the startup sequence, i.e., before the speed of the motor becomes equal to or greater than the predetermined speed. Due to the nature of the PMAC motor 210 in the frequency domain (i.e., the mechanical oscillatory nature of the PMAC motor 210) during the startup sequence 820, the current regulator trying to rotate the constant current vector at the reference speed results in an oscillatory current response on trace 812.

Referring to FIG. 8B, graph 840 illustrates that when the method for startup of the PMAC motor 210 in accordance with the present embodiment is implemented utilizing both speed and torque dampening in response to detection of current ripple, the current response 842 during the startup sequence 820 is smoothed out, removing the current oscillations. Therefore, utilizing a startup mode or sequence in accordance with the present embodiment prevents startup failure caused by over-current trips and allows the startup torque to be increased without increasing current protection limit, thereby providing faster acceleration during startup.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A controller configured to generate torque command currents controlling a permanent magnet alternating current (AC) motor, the controller comprising:
a current ripple detector configured to detect current ripple in stator currents of the permanent magnet AC motor and to generate a current ripple signal in response thereto;
a startup torque command module configured to modify a predetermined startup torque command in response to the current ripple signal to generate a torque command, the start up torque command module being coupled to the current ripple detector;
a torque-to-current converter configured to convert the torque command to the torque command currents; and
a first startup switch controller configured to couple the startup torque command module to the torque-to-current converter after startup of the permanent magnet AC motor while a detected speed of the permanent magnet AC motor is less than a predetermined speed.

2. The controller in accordance with claim 1 wherein the current ripple detector comprises:
a transient current simulation module configured to generate a transient current signal in response to the stator currents;
a current amplitude adjustment module configured to generate a current amplitude signal in response to the stator currents; and
a current ripple summer configured to generate the current ripple signal in response to a difference between the transient current signal and the current amplitude signal.

3. The controller in accordance with claim 2 further comprising:
a startup rotor position module coupled to the current ripple detector configured to modify a speed command in response to the current ripple signal to generate a startup rotor position signal; and
a second startup switch controller coupled to the startup rotor position module configured to provide the startup rotor position signal controlling of the permanent magnet AC motor after startup thereof while the detected speed of the permanent magnet AC motor is less than the predetermined speed.

4. The controller in accordance with claim 3 wherein the startup rotor position module comprises:
a speed dampening module coupled to the current ripple detector configured to generate a speed damping signal in response to the current ripple signal;
a startup speed summer configured to modify the speed command by subtracting the speed damping signal therefrom to generate a startup speed command; and
an integrator coupled to the startup speed summer configured to generate the startup rotor position signal in response to the startup speed command.

5. The controller in accordance with claim 2 wherein the startup torque command module comprises:
a torque dampening module coupled to the current ripple detector configured to generate a torque damping signal in response to the current ripple signal; and
a startup torque command summer configured to modify the predetermined startup torque command by subtracting the torque damping signal therefrom to generate the torque command for providing to the torque-to-current converter.

6. An electric motor system comprising:
a permanent magnet alternating current (AC) motor;
a field orientation controller coupled to the permanent magnet AC motor configured to modify phase currents supplied to the permanent magnet AC motor to provide electric control therefore; and
a controller coupled to the phase currents and comprising:
a current ripple detector configured to detect a current ripple in the phase currents of the permanent magnet AC motor and generating a current ripple signal in response thereto;
a startup torque command module coupled to the current ripple detector configured to modify a predetermined startup torque command in response to the current ripple signal to generate a torque command;
a torque-to-current converter configured to convert the torque command to torque command currents; and
a startup switch controller configured to couple the startup torque command module to the torque-to-current converter after startup of the permanent magnet AC motor while a detected speed of the permanent magnet AC motor is less than a predetermined speed,
wherein the field orientation controller is coupled to the torque-to-current converter configured to modify the phase currents for control of the permanent magnet AC motor in response to pulse width modulated currents generated in response to the torque command currents.

7. The electric motor system in accordance with claim 6 wherein the current ripple detector of the controller comprises:
a transient current simulation module configured to generate a transient current signal in response to the phase currents;

a current amplitude adjustment module configured to generate a current amplitude signal in response to a predetermined startup torque command; and a current ripple summer configured to generate the current ripple signal in response to a difference between the transient current signal and the current amplitude signal.

8. The electric motor system in accordance with claim 7 the startup torque command module of the controller comprises:

a torque dampening module coupled to the current ripple detector configured to generate a torque dampening signal in response to the current ripple signal; and a startup torque command summer configured to modify the predetermined startup torque command by subtracting the torque dampening signal therefrom to generate the torque command for providing to the torque-to-current converter.

9. The electric motor system in accordance with claim 7 wherein the controller further comprises a startup rotor position module coupled to the current ripple detector configured to modify a speed command in response to the current ripple signal to generate a startup rotor position signal, and wherein the startup switch controller is coupled to the startup rotor position module configured to couple the startup rotor position module to the field orientation controller after startup of the permanent magnet AC motor while the detected speed of the permanent magnet AC motor is less than the predetermined speed.

10. The electric motor system in accordance with claim 9 wherein the startup rotor position module of the controller comprises:

a speed dampening module coupled to the current ripple detector configured to generate a speed dampening signal in response to the current ripple signal;

a startup speed summer configured to modify the speed command by subtracting the speed dampening signal therefrom to generate a startup speed command; and an integrator coupled to the startup speed summer configured to generate the startup rotor position signal in response to the startup speed command.

11. The electric motor system in accordance with claim 9 wherein the controller further comprises:

a high speed sensorless controller coupled to the phase currents configured to generate a sensorless rotor position signal and a sensorless speed signal in response to voltages and currents of the phase currents; and a speed controller configured to generate a high speed torque command in response to the speed command modified in response to the sensorless speed signal, the speed controller coupled to the startup switch controller for providing the high speed torque command thereto, wherein the startup switch controller decouples the current ripple detector from the torque-to-current converter and couples the speed controller thereto and decouples the startup rotor position module from the field orientation controller and couples the high speed sensorless controller thereto in response to determining that the detected speed of the permanent magnet AC motor is greater than or equal to the predetermined speed.

* * * * *